Aug. 5, 1952 — J. A. SIMPSON, JR — 2,606,296
RADIATION COUNTER
Filed April 28, 1947 — 7 Sheets-Sheet 1

Inventor:
John A. Simpson, Jr.
By: Robert A. Lavender
Attorney

Aug. 5, 1952　　　　J. A. SIMPSON, JR　　　　2,606,296
RADIATION COUNTER
Filed April 28, 1947　　　　　　　　　　　　　7 Sheets-Sheet 5

Inventor:
John A. Simpson, Jr.
By: Robert A. Lavender
Attorney

Patented Aug. 5, 1952

2,606,296

UNITED STATES PATENT OFFICE 2,606,296

RADIATION COUNTER

John A. Simpson, Jr., Chicago, Ill., assignor to the United States of America as represented by the United States Atomic Energy Commission Application April 28, 1947, Serial No. 744,499

19 Claims. (Cl. 250—83.6)

This invention relates to improved radiation counters. More specifically, the invention relates to Geiger-Müller counters and proportional counters which operate at voltages far below the counters heretofore known in the art.

The need for radiation counters having relatively low operating potentials has long been recognized. The desirability of this feature is particularly apparent in portable radioactivity detecting instruments and in cosmic ray study equipment. In both of these fields of endeavor it has heretofore been necessary to employ power supplies having voltages of the order of a thousand volts. Such power supplies, in order to be sufficiently reliable and stable for radiation counter service, must of necessity be large and heavy. Thus, the high operating voltages of the counters heretofore in use have constituted a limitation on the portability of instruments for the detection and measurement of radioactivity.

The present invention lies in the development of Geiger-Müller and proportional counters with extremely low operating voltages. By the present invention, there are now made available for the first time Geiger-Müller counters and proportional counters operating with accuracy and reliability at potentials in the heretofore unattainable range of from 125 to 300 volts. The counters which are the subject matter of this invention have made possible the construction of radiation detecting and measuring instruments of a compactness and portability heretofore unknown.

It will thus be seen that the principal object of this invention is to provide radiation counters having low operating potentials. Subsidiary to this principal object, the invention has achieved the object of obtaining gas mixtures which, when used as the ionizing medium of radiation counters, produce the desired low operating potentials. In further pursuance of the principal object stated above, the invention teaches the selection of electrode dimensions which cooperate with the gas mixture in producing such low voltage radiation counters.

Generally, the objects of this invention have been achieved by reason of the discovery that certain beliefs heretofore prevalent in the art regarding the nature and limitations of various expedients which have been attempted for lowering the potentials of radiation counters are partially if not wholly erroneous. Heretofore, it was commonly believed that satisfactory counter operation could be obtained from a counter filled with a mixture of gases only if the operating potential of the counter were intermediate between the operating potentials of counters filled with each of the gases comprising the mixture. Likewise it was heretofore thought that the operating potential of radiation counters is always reduced by reducing the size of the smaller electrode, thus increasing the electric field intensity in the region of the smaller electrode for any given voltage between the electrodes. Further, it was thought that for any given gas or mixture of gases as the ionizing medium of a radiation counter, the voltage required for operation would increase with increasing pressures at pressures above about 1 or 2 centimeters Hg. Since it is known that satisfactory counter operation cannot be obtained at pressures below about 3 centimeters, it was thought that the operating potentials of counters could not be made extremely low without producing counters of such low efficiency as to be relatively useless. In the present invention all of these beliefs heretofore held in the art of radiation counters are shown to be erroneous. It is shown that gas mixtures may be employed as the ionizing medium of radiation counters which have operating potentials far below the operating potentials of counters filled with the gases separately. It is further shown that there are optimum ratios between the sizes of the electrodes of the counter for producing low voltage operation. It is further shown that gas mixtures chosen in accordance with the teachings of the invention demonstrate the property of providing counters of low operating potential within a region of pressures sufficiently high to provide highly efficient counter operation.

For complete understanding of the invention, reference is made to the drawings, in which.

Figure 1:
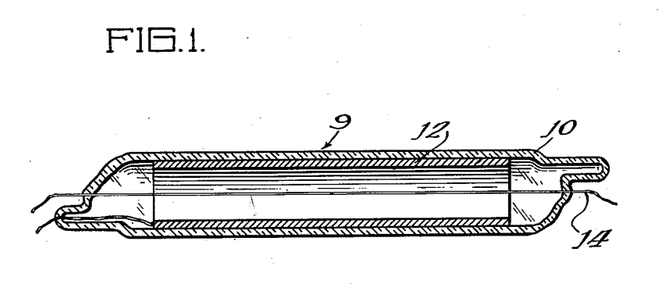
Fig. 1 is a central sectional view of a radiation counter having concentric electrodes.

Fig. 1 illustrates a conventional type of radiation counter 9. The envelope 10 is of glass and the outer electrode 12, a sleeve of a suitable material such as copper, is placed within the envelope 10. The central electrode 14 is axial of the outer electrode 12 and the envelope 10 is completely sealed and contains a gaseous ionizing medium. The teachings of the present invention relate particularly to the nature of the gaseous ionizing medium to be used and the ratio of diameters of the outer electrode 12 and the central electrode 14.

The potential applied between the central electrode 14 and the outer electrode 12 determines whether the device operates as a Geiger-Müller counter or as a proportional counter. The bulk of the discussion herein will be concerned with the operation of the counter as a Geiger-Müller counter, since it is for such use that the development of low voltage radiation counter presents the greatest difficulties. However, as will be pointed out below, the teachings of the invention regarding Geiger-Müller counters are easily applicable to proportional counters by operation of the counters at lower voltage.

Figure 2:
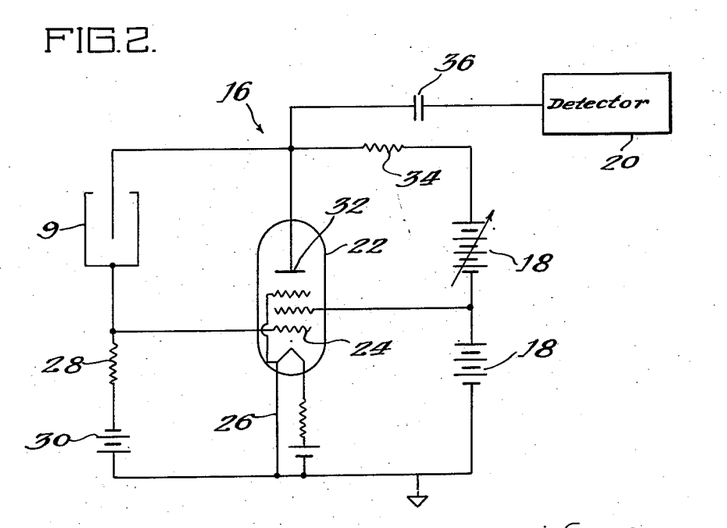
Fig. 2 is a schematic electrical diagram of a radiation counting system employing a Geiger-Müller tube.

The circuit of Fig. 2 shows a Geiger-Müller counter 9, together with an associated quenching circuit, collectively designated 16, a source of direct voltage 18 and a detector 20. A vacuum tube 22 is connected as an amplifier, the control grid 24 being connected to the cathode 26 by a grid resistor 28 and a bias supply 30. The Geiger-Müller counter 9 is connected between the plate 32 and the grid 24 of the tube 22. The plate 32 and one electrode of the counter 9 are connected to the positive terminal of the voltage supply 18 through a plate circuit resistor 34, the negative terminal of the voltage supply 18 being connected to the cathode 26 of the tube 22. This circuit is the Neher-Harper quenching circuit which is well known in the art. Normally the full voltage of the power supply 18 is applied to the Geiger-Müller counter 9, the bias battery 30 being of a value sufficient to substantially cut off plate current in the tube 22. When ionization occurs, current flows through the Geiger-Müller counter 9 as the potential applied to the counter 9 is in a region of discharge. However this discharge current flows through the resistor 28, thus raising the potential of the grid 24 and allowing the tube 22 to conduct. The potential at the plate 32 thus immediately falls so that the potential across the Geiger-Müller counter 9 is reduced below the point at which the discharge is quenched. Thus, the circuit is restored to its normal condition and is again ready to respond to the passage of a new ionizing particle through the counter 9. The output is taken through an output coupling condenser 36.

The data hereinafter to be set forth was taken with a quenching circuit 16 wherein the vacuum tube 22 is a CK-512, the grid resistor 28 is 12.2 megohms, the plate circuit resistor 34 is 2 megohms, the output condenser 36 is 0.0002 microfarad, and the grid bias 30 is in the neighborhood of 5 volts, the exact grid bias values being different to some extent for the various counters to be described.

The detector 20 may assume any of a number of forms well known in the art. The simplest form of detector, which is useful on portable instruments for qualitative measurements, is a headphone which renders the pulses audible. In instruments for laboratory measurement, however, the detector 20 is either a scaling circuit or a counting rate meter depending upon the particular application. It will be understood that neither the quenching circuit 16 nor the detector 20 constitutes any part of the present invention except in combination with the novel radiation counters herein described.

Figure 3:
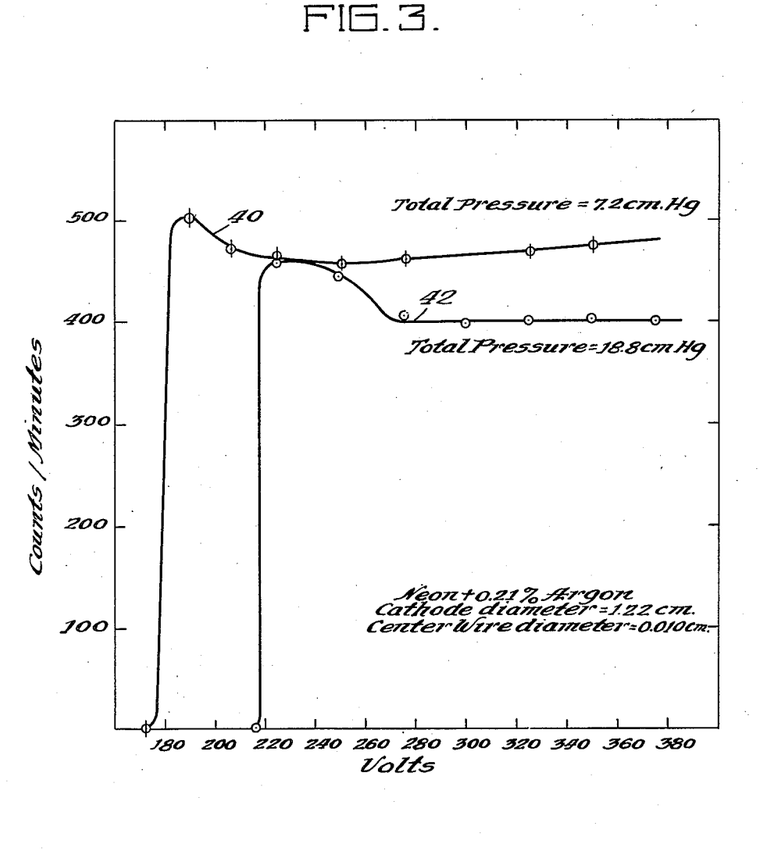
Fig. 3 is a graph showing the operating characteristics of two Geiger-Müller counters made in accordance with the invention.

In Fig. 3 are shown the characteristic curves of two counters built in accordance with the theory to be set forth later herein. Each of the two counters whose characteristics are illustrated, respectively, by the curves designated as 40 and 42, was filled with a mixture of neon plus 0.2 per cent argon. The diameter of the outer electrode 12, which was maintained negative so as to constitute the cathode, was 1.22 centimeters; the diameter of the center wire 14 was 0.010 centimeter. The cathodes were of copper having a cuprous oxide surface. The curve 40 illustrates the indicated counting rate (with an arbitrarily selected gamma ray source) with the counter filled to a total pressure of 7.2 centimeters Hg. In the counter of curve 42, the pressure is 18.8 centimeters Hg. The slope of the curve 40 in the operating plateau region is approximately 0.04 per cent per volt. The slope of the curve 42 is approximately 0.01 per cent per volt. It will be seen that the two counters whose characteristic curves are drawn in Fig. 3 have operating regions which are far below the operating regions heretofore known in the art. The counter of curve 40 may be operated at from about 220 volts to well over 360 volts, thus having a plateau of about 140 volts, which is about 50 per cent of the threshold voltage. The counter of curve 42 operates properly from about 270 volts to at least 380 volts with an extremely flat plateau characteristic.

Figure 4:
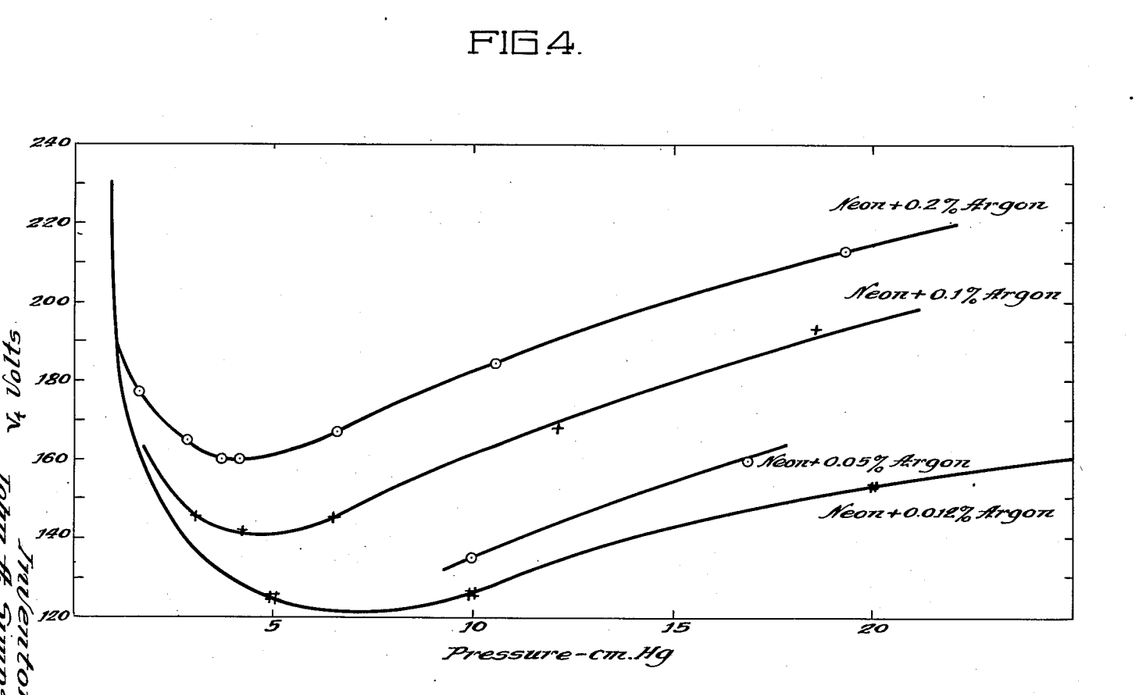
Fig. 4 is a graph showing threshold counting potentials of Geiger-Müller counters at various pressures for various gas mixture fillings composed in accordance with the teachings of the invention.

In Fig. 4 there are plotted a number of curves showing the Geiger-Müller threshold potential $V_t$ as a function of pressure for neon mixed with a number of various percentages of argon. Here again, it will be seen that the threshold potentials are considerably below the potentials heretofore required for operation of a Geiger-Müller counter. It will further be noted that all of the counters have counting thresholds far below the well-known thresholds for either pure neon or pure argon, and that the mixture of neon with 0.012 per cent argon exhibits a minimum threshold potential at a value of pressure above 5 centimeters Hg.

Figure 5:
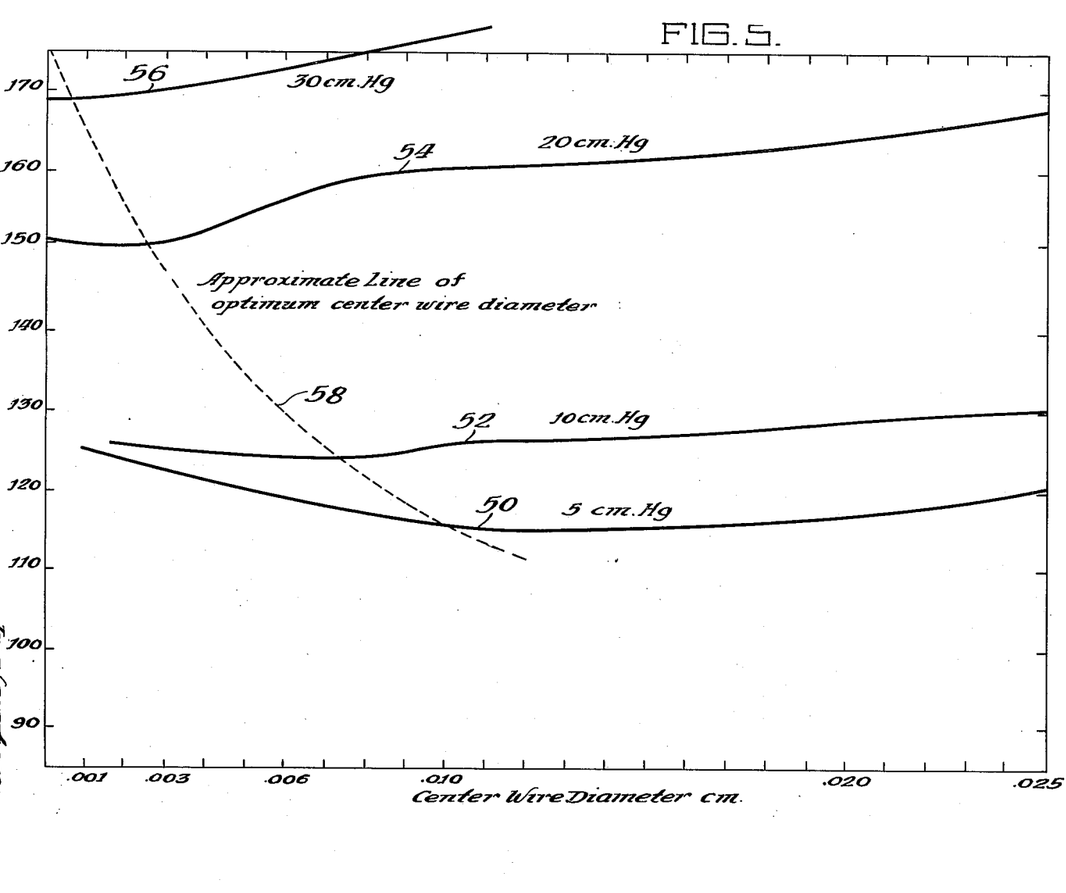
Fig. 5 is a graph showing threshold counting potentials as a function of diameter of the center electrode of the radiation counter of Fig. 1 at various values of pressure of a gas mixture composed in accordance with the teachings of the invention, and further showing the approximate line of optimum center wire diameter for the various pressures.

In Fig. 5 it may be seen that the belief heretofore held in the art that a smaller center wire necessarily produces a lower required operating potential for a counter is untrue. The curves 50, 52, 54, and 56 show the threshold counting potentials $V_t$ of counters having a cathode diameter of 1.22 centimeters as a function of center wire diameter at pressures of 5, 10, 20, and 30 centimeters Hg of a mixture of neon with 0.012 per cent argon. The dotted line 58 which is drawn through the minima of the curves 50, 52, 54, and 56, therefore represents the locus of the optimum center wire diameters. It will be seen that each of the curves 50, 52, 54, and 56 has a minimum point, and that it is, therefore, not true that the operating potential is necessarily minimized by minimizing the diameter of the center wire.

There have been given above a description and data concerning a number of gas fillings and electrode size ratios which produce radiation counters having extremely low operating potentials. However, for a full understanding of the import of the present invention, mere description of particular counters is inadequate. In order to understand the full scope of the invention and the equivalents to the described counters which may be readily designed, it is necessary to examine into the theory upon the basis of which the low voltage counters above described have been achieved.

For over a decade various expedients have been used to reduce the operating potentials of two-electrode Geiger-Müller and proportional counters. These may be reviewed. These attempts fall into three broad classes:

(1) Reduction of gas pressure. This method has been widely used but is extremely limited by the rapid decrease in counter efficiency and adequacy of counter performance with decreasing pressure. Threshold potentials as low as 375 volts have been obtained in helium at pressures of about 1 centimeter Hg. The well known minimum breakdown voltage in permanent gases such as argon which occurs at about 0.1 to 0.8 centimeter Hg pressure has been used to give counting threshold potentials of about 300 volts. However, the efficiency of such counters is extremely low, and the counters possess very poor characteristics. All experimental evidence indicates that gas pressures above 2 centimeters Hg are needed for adequate counter performance.

(2) Changes in the relative diameters of the electrodes. In attempting to minimize operating potentials, it has been common to reduce the center wire size to the limit imposed by mechanical problems.

(3) Mixtures of permanent gases. Counters filled to moderate pressures have been used in which the counting threshold potentials were reduced by 10 to 30 per cent from the threshold potentials of the principal gases alone. Such mixtures have been operated as counters down to the neighborhood of 400 volts. The counting characteristics were not however satisfactory, and it has been believed that the starting potentials of mixtures which have satisfactory counter characteristics lie between the starting potentials of the individual constituents.

In order to understand the present invention, it is first necessary to examine into work which has been done on the general theory of discharges in gases. As the potential difference is increased between two electrodes in a gas, the current which flows is at first due to residual ionization in the gas volume and photo-emission at the cathode. This is the ion chamber region designated by the numeral 60 in Fig. 6. In this region, under optimum conditions, all ions formed in the volume are collected at the electrodes. Currents of the order of $10^{-16}$–$10^{-14}$ amperes may be expected as a result of ionization due to "background" radiation which is always present. Further increasing the potential difference will lead to ion multiplication within the gas volume, since the electrons accelerated toward the anode may acquire enough energy on the average between collisions to produce excitation and ionization of the atoms by collisions. This is the "avalanche" region 62, in which the proportional counter is operated. The probability of this exponential multiplication process occurring increases rapidly with increasing potential difference applied between the electrodes. Soon a region is reached in which the probability approaches unity, that an electron formed in the gas will produce an ion pair by a secondary process. This leads to a self-sustaining discharge, that is, a discharge not dependent on external ionizing events. The potential for which the discharge current increases by a factor of $10^7$–$10^8$ and becomes self-sustaining is called the breakdown potential, $V_B$, for that particular system. This represents the beginning of the corona discharge region 64. Above the strong corona discharge (in the neighborhood of $10^{-6}$ amperes) are several regions which do not concern this invention. Rather it is (1) the electron avalanche region 62 immediately below the breakdown potential which determines proportional counter characteristics and (2) the breakdown voltage $V_B$ and the corona current region 64 immediately above $V_B$ which determines G.-M. counter characteristics, that are of particular interest.

It has long been known, that permanent gases such as neon and argon have relatively low breakdown potentials. However, it is likewise well known in the art that attempts to operate radiation counters filled with such gases in the pure state have not met with success, due to the fact that during the initial portion of the discharge, metastable atoms are formed. These metastable atoms remain in the counter volume for relatively long periods of time, until radiation takes place, or collision occurs and the energy of the metastable state is transferred. The lifetime of these metastable states, before radiation takes place, is of the order of $10^{-4}$ seconds or longer. Such metastable atoms may collide with the walls of the counter or may radiate, either process giving rise to a secondary electron. If such secondary electrons are produced when the counter is in a condition to support a further discharge, a new discharge occurs, new metastable atoms are formed, still more secondary electrons are produced, and the discharge in the counter does not terminate. Therefore, it has been found necessary to use a foreign gas which de-excites the metastable states. Thus, it has become common in the art to add a few per cent of hydrogen to a counter filled with pure argon or neon to insure that a collision will take place within a time short compared to the lifetime of the metastable state, and therefore will result in the elimination of the metastable atoms which would otherwise produce secondary electrons, thus producing a continuous discharge.

It may be shown that for parallel plates the breakdown voltage $V_B$ of any gas or gas mixture may be expressed as:

$$V_B = \frac{1}{\eta} \ln \frac{1}{\gamma}$$

$\eta$ is the ionization per volt coefficient which expresses the number of ion pairs formed per volt potential difference within the gas and is found to be a function of $E/p$, where E is the field strength in volts per centimeter and $p$ is the gas pressure in mm. Hg. $\gamma$ is the number of extra electrons ejected from the cathode per ion pair formed in the gas and varies with both the electrode configuration and the surface material of the cathode. The types of secondary process which contribute to establishing the value of $\gamma$ are principally:

(1) Emission of electrons by positive ion bombardment;
(2) Photo-electron emission; and
(3) Emission of electrons due to metastable atoms approaching the cathode.

Although the above equation for the breakdown voltage, $V_B$, is valid only for parallel plate electrodes giving homogeneous field conditions, inspection of the equation gives some indication of the dependence of $V_B$ on $\eta$ for a system of concentric electrodes. It will be seen that the breakdown voltage decreases with increasing values of the ionization per volt coefficient of the gas. It will likewise be seen that the breakdown voltage decreases at a much slower rate with increasing values of $\gamma$. It will subsequently be shown herein that in radiation counters, it is highly desirable to minimize $\gamma$, since by so doing the increase in operating voltage is negligible while the counter characteristics are vastly improved. It may be noted that for concentric electrodes the computation of the breakdown voltage of a gas is more complex, particularly since in such a system the quantity $E/p$ is not constant, and the value of $\eta$ likewise varies throughout the space between the electrodes. An approximate expression for the discharge condition is:

$$\gamma e \int_0^{V_B} \eta dv = 1$$

where $e$ is the base of natural logarithms. Although this expression is more complex than that for parallel plates, it will be seen that the general criterion for minimizing the breakdown voltage is the same in both cases.

Figure 7:
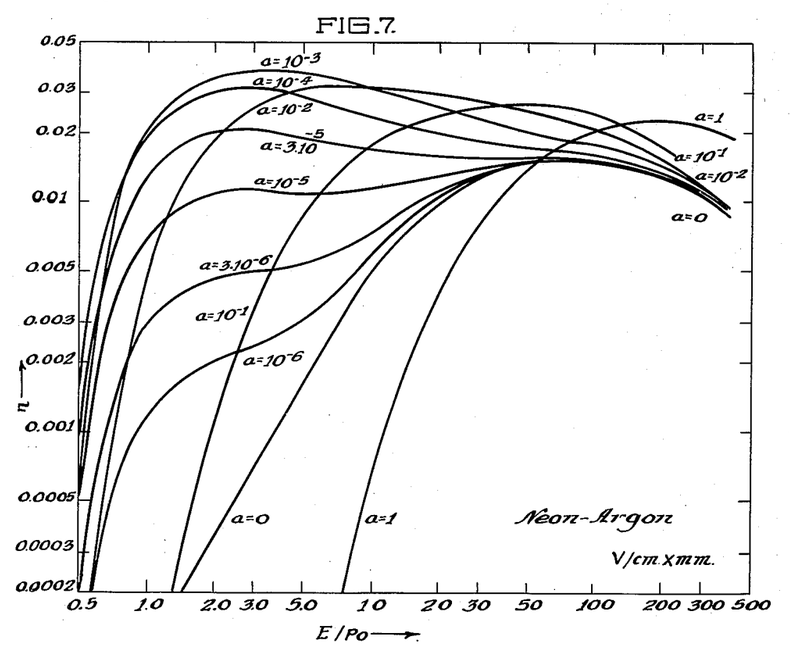
Fig. 7 is a graph showing the value of the ionization per volt coefficient of a mixture of neon and argon as a function of the ratio of electric field intensity to gas pressure for various proportions of neon and argon in said mixture.

Extensive measurements of $\eta$ have been reported in the literature (A. A. Kruithof and F. M. Penning, Physica 3, 515 (1936), Physica 4, 430 (1937); M. J. Druyvesteyn and F. M. Penning, Rev. Mod. Phys. 12, 87 (1940)). The values of $\eta$ for mixtures of pure neon and argon at low values of $E/p$ are among the largest experimentally determined. Figure 7 shows the values of $\eta$ for neon, argon and mixtures thereof as a function of $E/p$. The symbol $a$ as used in the graph designates the proportion of argon present. The mixtures demonstrate unusually low breakdown potentials, far below those of neon or argon alone.

Such gases have not heretofore been employed for radiation counters in view of the unsatisfactory counting characteristics heretofore obtained in using permanent gases singly. The essence of the present invention lies in a detailed study of the properties of such mixtures having low voltage characteristics which reveals the reasons for the observed high values of $\eta$ or low values of $V_B$, and has resulted in the discovery that such mixtures, in addition to having low breakdown voltages, are capable of use as the ionizing medium of radiation counters without producing the undesirable counter characteristics to avoid which foreign gases have heretofore been added to inert or noble gases. The discovery also enables the selection of other gas mixtures which show similar properties of low voltage and proper counter operation.

Electrons in collision with gas atoms which may be designated $G_1$, such as pure neon, may excite the atoms and leave them in metastable states $G_1^m$ for considerable periods of time. Thus, large amounts of energy removed from the electric field by electrons are used to produce excitation and not ionization. This will result in small values of $\eta$ or large values of $V_B$ for such gases. When, however, a small quantity of a second gas $G_2$ is admixed with gas $G_1$ the mean life time of metastable atoms $G_1^m$ may be reduced to a very small value.

This will occur provided the second gas has a first ionization potential $V_2$ which is less than, but close to, the potential $V_1^m$ of the metastable state of the principal gas $G_1$. The following collision process will take place between an atom of kind $G_1$ in its metastable state $G_1^m$ and a neutral atom $G_2$ under these conditions:

$$G_1^m + G_2 \rightarrow G_1 + G_2^+ + \text{electron}$$

It is evident that for a given production rate of metastables $G_1^m$ in gas $G_1$ at pressure $p_1$ there is an optimum amount of $G_2$, say $p_2$, to provide for complete removal of metastable states in any given time to give a minimum breakdown potential $V_{B\ min.}$. If an amount $p_2'$ which is less than $p_2$ of $G_2$ is combined with $G_1$, then the breakdown potential $V_B$ will be greater than $V_{B\ min.}$. In this case, $V_B$ lies between the value $V_B$ for pure neon and $V_{B\ min.}$ because excitation losses occur in the production of metastable states by the electrons. Also if $p_2'$ is greater than $p_2$, $V_B$ will be greater than $V_{B\ min.}$ since electrons will begin to give up considerable amounts of energy to excite the atoms $G_2$. Thus, the field intensity at any point in the volume would have to be greater than under conditions for $V_{B\ min.}$.

The combinations of permanent gases which fulfill the conditions as to ionization potentials and energy levels of the metastable states set out above include:

| Vehicular Gas | Second Gas |
| --- | --- |
| Ne ($V_1$=21.4 e. v.; $V_1^m$=16.6 e. v. ) | A($V_2$=15.7 e. v.) |
| Hc ($V_1$=24.4 e. v.; $V_1^m$=20.55 e. v.) | Xe($V_2$=11.5 e. v.) |
| He ($V_1$=24.4 e. v.; $V_1^m$=20.55 e. v.) | A($V_2$=15.7 e. v.) |

Figure 8:
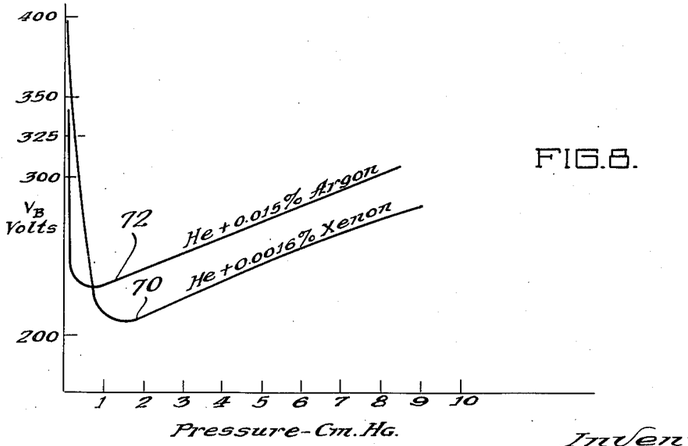
Fig. 8 is a graph showing breakdown potentials in certain gas mixtures as a function of pressure.

In Fig. 8 are shown curves 70 and 72 of the breakdown voltages of helium with $1.6 \times 10^{-3}$ per cent xenon added and helium plus $1.5 \times 10^{-2}$ per cent argon added, respectively, as a function of pressure.

The analysis given above is the reason for the very low breakdown voltages for the gas mixtures described, and indicates that such mixtures, in addition to exhibiting low values of breakdown potentials, will provide counters with desirable counting characteristics. As was pointed out above, for proper operation of a permanent gas counter, metastable states must be removed from the gas by collision before radiation takes place. The collision process described above, where the second gas has a first ionization potential which is somewhat less than the potential of the metastable state of the vehicular gas, serves not only to lower the potential necessary for breakdown as described above, but likewise, in removing metastable atoms, to eliminate a source of difficulty which has heretofore been encountered in the operation of radiation counters filled with permanent gases free of foreign gases. Thus, although in general it is not true that gases having low breakdown potentials afford satisfactory fillings for radiation counters, the discovery of this invention is that mixtures such as described above are desirable in both respects. It is found that instead of adding small amounts of a foreign gas such as hydrogen to the permanent gas filling in order to absorb the energy of the metastable states, the energy may be absorbed by introducing a suitable small quantity of a second permanent gas having a first ionization potential somewhat below the potential of metastable atoms of the vehicular gas. In this manner, not only are the discharge characteristics of the gas rendered satisfactory for counting ionization pulses, but also the operating potential of the counter is lowered to ranges heretofore unknown.

Figure 9:
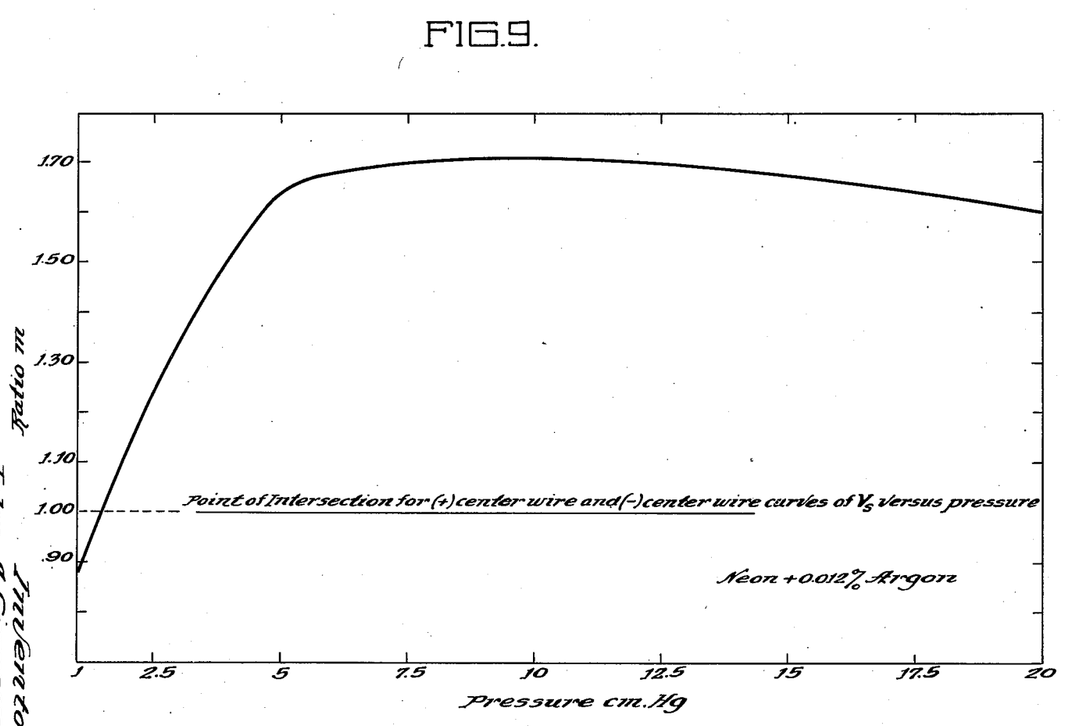
Fig. 9 is a graph showing the ratio of the breakdown voltage with the smaller electrode negative to the breakdown voltage with the smaller electrode positive as a function of pressure of the ionizing medium.

It should be noted that counters constructed in accordance with the criteria delineated above should have the center electrode positive with respect to the outer electrode in order to maximize the advantage gained in low voltage operation. In most gases, the breakdown potentials are higher with the center electrode of the concentric system positive. However, in the mixtures which are the subject of the present invention, the reverse is true at pressures above 5 centimeters Hg which are in the range of interest for radiation counters. An example of this anomalous lowering of $V_B$ when the center electrode is the anode and the pressure is in this range is illustrated in the curve of Fig. 9 showing the ratio $m$ as a function of pressure for a mixture of neon with 0.012 per cent argon with a copper outer electrode 1.22 centimeters in diameter and an inner electrode 0.008 centimeter in diameter, where $m$ is the ratio of $V_B$ for a negative center electrode to $V_B$ for a positive center electrode.

Explanation may now be made of the existence of optimum center wire diameters for various pressures of the gas mixtures, as illustrated in Fig. 5. The explanation of these characteristics depends upon a knowledge of the field intensity distribution within the concentric counter. As is well known, the field gradient will vary inversely with the radius, so that the electric field strength is maximized at the center wire, which as stated above, is preferably the anode. From inspection of Fig. 7, it will be seen that if the field strength is too high at the anode at any given pressure, the value of $\eta$ at this point will no longer be maximized. Since most of the electron production in the discharge takes place near the anode center wire, the breakdown potential will be increased if the point of maximum $\eta$ is too far from the center wire, as will result if the center wire is too small. On the other hand, if the center wire is too large, all the values of $E/p$ in the counter will lie below the points of maximum value for $\eta$. $\eta$ would have its maximum value at the center wire but this maximum value would not correspond to the high values of $\eta$ obtainable in the gas mixture. Thus, it is desirable for optimum performance, as illustrated in Fig. 5, that the ratio of the center wire diameter to the cathode diameter be such that the maximum value of $\eta$ within the counter occurs adjacent to the center wire, as opposed to at the center wire, so that the integrated value of $\eta$ throughout the counter is maximized.

It may be shown that the cathode surface, although affecting the value of $\gamma$ defined above, cannot appreciably contribute to the lowering of breakdown potentials and from this point of view would not be important in achieving low-voltage counters.

The secondary effects at cathodes are important, however, in determining other operating characteristics of G.-M. counters. An ionizing event within the counter gas is followed by multiplication of the initial ion pairs near the anode center wire. Photons produced in this process may eject electrons from the cathode which then extend the avalanche process along the length of the counter. A positive ion sheath soon forms, and the center wire may drop rapidly below $V_B$. For high values of $\gamma$ the positive ions or metastable atoms approaching the cathode surface may eject electrons. These secondary electrons may either continue the discharge so that the counter cannot recover, or, if a long lived metastable atom approaches the cathode, may produce a spurious pulse. Thus, it is important to use cathode surfaces with low values of $\gamma$ to insure adequate counting characteristics.

Experiments have been run to illustrate the change in $V_B$ with $\gamma$ and the change of performance of the counter tubes with $\gamma$. Three copper cathodes were prepared. The cathode surface in one group was mechanically cleaned copper, in the second a thick layer of CuO on copper, and in the third a thick layer of $Cu_2O$ (brick red oxide) on copper. The first group, the mechanically cleaned copper, had a threshold of 190 volts and counter performance was unsatisfactory. The second group, CuO surface, had a threshold potential of 189 volts and the counter performance was again unsatisfactory. The third group, $Cu_2O$ surface, had a threshold of 192 volts but the counter performance was excellent. It was found that increasing photo-sensitivity of the cathode accompanied decrease in the threshold voltages and decrease of the satisfactoriness of the operations of the counters. Thus, the theory above, which indicates that the decrease in $\gamma$, while effecting greatly improved counter performance, raises the counter operating potential only slightly, is verified.

A number of experiments were run to determine the properties of various types of cathode surfaces. Surfaces in the approximate order of decreasing $\gamma$ are platinum, nickel, silver, cleaned copper, ordinary cupric oxide, and brick red cuprous oxide. Counter operating characteristics range from severe random breakdowns with the platinum cathodes to excellent counter action for cuprous oxide.

Figure 6:
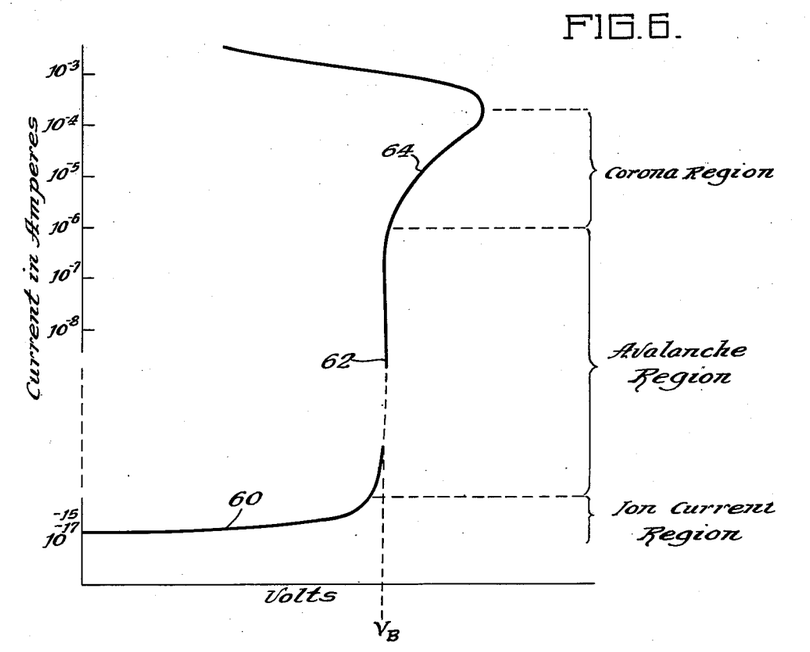
Fig. 6 is a graph showing the typical characteristics of an electrical discharge in any gas.
Figure 10:
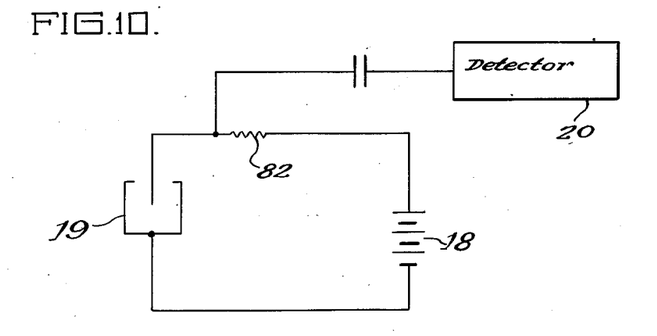
Fig. 10 is a schematic electrical diagram of a radiation counting system employing a proportional counter or a self-quenching Geiger-Müller counter.

The proportional counter region lies between the potential at which the ion multiplication begins to occur at the center wire and extends to the breakdown potential $V_B$ as shown in Fig. 6. Therefore, all discussions of the threshold potentials for G.-M. counters which have been presented above also define the operating potentials for proportional counter action. Proportional counters have been built using neon-argon mixtures and demonstrate satisfactory proportional counter characteristics. With a proportional counter, no quenching circuit is necessary and the circuit used is merely the counter 9 in series with the voltage supply 18 and a signal resistor 82 as illustrated in Fig. 10.

The permanent gas mixtures herein described may also be used in the Geiger-Müller region without a quenching circuit by introducing small amounts of polyatomic vapors, such as alcohol, which, as is well known in the art, renders the counter "self-quenching." However, it has been found that in the absence of the quenching circuit, such counters have extremely short lives. This is due to the fact that in order to maintain the low operating potentials which are desired, the amount of alcohol or other polyatomic gas must be very small. The molecular structure of the small amounts so introduced is rapidly changed so that the desired quenching action is lost.

The necessary and sufficient conditions for producing low voltage radiation counters in accordance the invention may be summarized as follows: Mixtures of noble or permanent gases must be used in which the energy level of the principal metastable state of the vehicular gas lies above the first ionization potential of the second gas. An optimum amount of the second gas exists for which the threshold potential of the mixture will be a minimum at any given pressure. Only gas mixtures are used in which the ionization per volt coefficient has maxima in the region of $E/p$ values between 1 and 50. Maximum values of this coefficient of the order of 0.01 are required. Concentric electrode systems or similar electrode systems producing non-homogeneous electric fields are to be used with the anode as the smaller electrode. The electrode system should be used with the selected gas mixture at pressures such that the breakdown voltage with the smaller electrode negative is greater than the breakdown voltage with the smaller electrode positive. For any given cathode size selected, there will be an optimum value for the size of the anode with which the maximum value of the ionization per volt coefficient in the particular gas mixture and pressure occurs adjacent to, but not at, the anode. The surfaces of the counter cathodes must be such as to minimize secondary processes, that is, to minimize $\gamma$. The amount of the second gas added should be sufficient to remove the metastable states of atoms within $10^{-4}$ seconds. The amount of the second gas added to achieve optimum counter action in this respect may be more than the optimum amount for producing minimum threshold values at any given pressure. The counters employ gas mixtures at pressures from 4 centimeters Hg ($V_t=112$–125 volts) to beyond 50 centimeters Hg ($V_t=210$–250 volts). The counters which have threshold potentials in the very low range are suitable for qualitative detection of radiation, while counters operating above 140 volts demonstrate characteristics which render them well adapted for quantitative measurements.

It will be understood that the invention should not be limited to the embodiments illustrated in the drawing and described above. Persons skilled in the art will readily utilize the teachings of the invention for the construction of a large variety of radiation counters.

What is claimed is:

1. In a radiation detecting system, a radiation counter comprising, in combination, two concentric electrodes and an ionizing medium therebetween, one of said electrodes being constructed of a material emitting relatively few electrons upon positive ion bombardment, the medium comprising a mixture of a vehicular permanent gas and a second permanent gas, in which the energy level of the principal metastable state of the vehicular gas is slightly above the first ionizing potential of the second gas, the mixture having an ionization per volt coefficient having a maximum value at a value of the ratio of electric field intensity to pressure between 1 and 50, the maximum value being at least about 0.01, said second gas being present in sufficient quantity to remove the metastable atoms of the vehicular gas within about $10^{-4}$ seconds, a source of potential connected to said electrodes, the negative terminal of said potential source being connected to the electrode producing relatively few secondary electrons, and a detector responsive to current surges between the electrodes induced by the passage of ionizing particles through said ionizing medium.

2. A radiation counter comprising, in combination, two concentric electrodes, and an ionizing medium therebetween, said medium comprising a mixture of a vehicular permanent gas and a second permanent gas in which the energy level of the principal metastable state of the vehicular gas is slightly above the first ionizing potential of the second gas, said mixture having an ionization per volt coefficient having a maximum value at a value of the ratio of electric field intensity to pressure between 1 and 50, said maximum value being at least about 0.01, said second gas being present in sufficient quantity to remove the metastable atoms of the vehicular gas within about $10^{-4}$ seconds, wherein the inner surface of the outer electrode comprises cuprous oxide.

3. A radiation counter comprising, in combination, two concentric electrodes and an ionizing medium therebetween, one of said electrodes being constructed of a material emitting relatively few secondary electrons upon positive ion bombardment, said medium comprising a mixture of a vehicular permanent gas and a second permanent gas in which the energy level of the principal metastable state of the vehicular gas is slightly above the first ionizing potential of the second gas, said mixture having an ionization per volt coefficient having a maximum value at a value of the ratio of electric field intensity to pressure between 1 and 50, said maximum value being at least about 0.01, said second gas being present in sufficient quantity to remove the metastable atoms of the vehicular gas within about $10^{-4}$ seconds, the ratio of the radii of said electrodes being such that the maximum value of the ionization per volt coefficient of said medium occurs adjacent to the surface of the inner electrode.

4. In a radiation detecting system, a radiation counter comprising, in combination, a plurality of electrodes and an ionizing medium therebetween, one of said electrodes being constructed of a material emitting relatively few secondary electrons upon ion bombardment, said medium comprising a mixture of a vehicular permanent gas and from 0.001 to 0.2 percent second permanent gas in which the energy level of the principal metastable state of the vehicular gas is slightly above the first ionizing potential of the second gas, a source of potential connected to said electrodes, the negative terminal of said potential source being connected to the electrode of the counter emitting relatively few secondary electrons, and a detector responsive to current surges between the electrodes induced by the passage of ionizing particles through said ionizing medium.

5. In a radiation detecting system, a radiation counter comprising, in combination, two concentric electrodes and an ionizing medium between said electrodes, the outer of said electrodes being constructed of a material which emits relatively few secondary electrons upon ion bombardment, said ionizing medium comprising a mixture of neon with from about 0.001 per cent to about 1.0 per cent argon at a pressure of from 5 to 50 centimeters Hg, the ratio of the radius of the outer electrode to the radius of the inner electrode being from about 20 to 1 to about 200 to 1, a potential source connected between said electrodes, with the inner electrode positive with respect to the outer electrode, and a detector responsive to current surges between the electrodes induced by the passage of ionizing particles through said ionizing medium.

6. A radiation counter comprising, in combination, a plurality of electrodes and an ionizing medium between said electrodes, said ionizing medium comprising a mixture of neon with from about 0.001 per cent to about 1.0 per cent argon at a pressure of from 5 to 50 centimeters Hg, at least one of said electrodes having a surface of cuprous oxide.

7. A radiation counter comprising, in combination, two concentric electrodes and an ionizing medium between said electrodes, said ionizing medium comprising a mixture of neon with from about 0.001 per cent to about 1.0 per cent argon at a pressure of from 5 to 50 centimeters Hg, the outer electrode being electrically negative with respect to the inner electrode and having an inner surface of cuprous oxide, the ratio of the radius of the outer electrode to the radius of the inner electrode being from about 20 to 1 to about 200 to 1.

8. In a radiation detecting system, a radiation counter comprising, in combination, two electrodes at potentials of opposite polarity and an ionizing medium therebetween, at least one of the electrodes being constructed of a material emitting relatively few secondary electrons upon ion bombardment, said medium comprising a mixture of a vehicular permanent gas and a second gas in which the energy level of the first metastable state of the vehicular gas is slightly above the first ionizing potential of the second gas, said mixture having an ionization per volt coefficient having a maximum value at a value of the ratio of electric field intensity to pressure between 1 and 50, said maximum value being at least about 0.01 and a detector responsive to current surges between the electrodes.

9. The system of claim 8 wherein the gaseous medium comprises neon with argon added thereto.

10. The system of claim 8 wherein the gaseous medium comprises helium and xenon added thereto.

11. The system of claim 8 wherein the gaseous medium comprises helium with argon added thereto.

12. The system of claim 8 wherein the gaseous ionizing medium comprises neon with from about 0.001 per cent to about 1.0 per cent argon added thereto.

13. In a radiation detecting system, a radiation counter comprising, in combination, two electrodes and an ionizing medium therebetween, the outer of said electrodes being constructed of a material that emits relatively few secondary electrons upon ion bombardment, said medium consisting of a mixture of a vehicular permanent gas and a second gas in which the energy level of the first metastable state of the vehicular gas is slightly above the first ionizing potential of the second gas, said mixture having an ionization per volt coefficient having a maximum value at a value of the ratio of electric field intensity to pressure between 1 and 50, said maximum value being at least about 0.01, a source of potential connected to said electrodes with the inner electrode positive with respect to the outer electrode, and a detector responsive to current surges between the electrodes, the source of potential having a normal voltage in the region of the breakdown voltage of said ionizing medium.

14. A Geiger-Müller counting system comprising the system of claim 13 wherein the normal voltage of the source of potential is in the corona region lying just above the breakdown voltage.

15. A proportional counter system comprising the system of claim 13, wherein the normal voltage of the source of potential is in the avalanche region lying just below the breakdown voltage.

16. A radiation counter comprising, in combination, two electrodes of different sizes having a non-homogeneous electric field distribution therebetween, at least one of said electrodes being constructed of a material which emits relatively few secondary electrons when bombarded by ions, and a gaseous ionizing medium between said electrodes consisting of a mixture of rare gases, said medium comprising neon with argon added thereto, wherein the ratio between the breakdown voltage with the smaller electrode electrically positive is greater than unity, the ratio of the sizes of said electrodes being such that the maximum value of the ionization per volt coefficient of said medium occurs adjacent to the smaller electrode.

17. A radiation counter comprising, in combination, two electrodes of different sizes having a non-homogeneous electric field distribution therebetween, at least one of said electrodes being constructed of a material which emits relatively few secondary electrons when bombarded by ions, and a gaseous ionizing medium between said electrodes consisting of a mixture of rare gases, said mixture comprising helium with xenon added thereto, wherein the ratio between the breakdown voltage with the smaller electrode electrically positive is greater than unity, the ratio of the sizes of said electrodes being such that the maximum value of the ionization per volt coefficient of said medium occurs adjacent to the smaller electrode.

18. A radiation counter comprising, in combination, two electrodes of different sizes having a non-homogeneous electric field distribution therebetween, at least one of said electrodes being constructed of a material which emits relatively few secondary electrons when bombarded by ions, and a gaseous ionizing medium between said electrodes consisting of a mixture of rare gases, said mixture comprising helium with argon added thereto, wherein the ratio between the breakdown voltage with the smaller electrode electrically positive is greater than unity, the ratio of the sizes of said electrodes being such that the maximum value of the ionization per volt coefficient of said medium occurs adjacent to the smaller electrode.

19. A radiation counter comprising, in combination, two electrodes of different sizes having a non-homogeneous electric field distribution therebetween, at least one of said electrodes being constructed of a material which emits relatively few secondary electrons when bombarded by ions, and a gaseous ionizing medium between said electrodes consisting of a mixture of rare gases, said ionizing medium comprising neon with from about 0.001 per cent to about 1.0 per cent argon added thereto, wherein the ratio between the breakdown voltage with the smaller electrode electrically positive is greater than unity, the ratio of the sizes of said electrodes being such that the maximum value of the ionization per volt coefficient of said medium occurs adjacent to the smaller electrode.

JOHN A. SIMPSON, Jr.

REFERENCES CITED

The following references are of record in the file of this patent:

UNITED STATES PATENTS

| Number | Name | Date |
|---|---|---|
| 1,481,422 | Holst et al. | Jan. 22, 1924 |
| 2,408,230 | Shoupp | Sept. 24, 1946 |

OTHER REFERENCES

Loeb, Electrical Discharge for Gases, John Wiley, N. Y., 1939, pages 506–513.

Korff, Electron and Nuclear Counters, D. Van Nostrand Co., April 1946, pages 121, 122.